US012136421B2

United States Patent
Bond et al.

(10) Patent No.: US 12,136,421 B2
(45) Date of Patent: Nov. 5, 2024

(54) SYSTEM AND METHOD FOR INTEGRATING AUDITORY AND NON-AUDITORY INPUTS FOR ADAPTABLE SPEECH RECOGNITION

(71) Applicant: GM Global Technology Operations LLC, Detroit, MI (US)

(72) Inventors: Jacob Alan Bond, Rochester Hills, MI (US); Hannah Elizabeth Wagner, Berkley, MI (US); Joseph F. Szczerba, Grand Blanc, MI (US); Alan D. Hejl, Ferndale, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 317 days.

(21) Appl. No.: 17/685,716

(22) Filed: Mar. 3, 2022

(65) Prior Publication Data
US 2023/0282210 A1    Sep. 7, 2023

(51) Int. Cl.
| | |
|---|---|
| *G10L 15/22* | (2006.01) |
| *B60W 40/08* | (2012.01) |
| *G06F 18/25* | (2023.01) |
| *G06N 3/08* | (2023.01) |
| *G06T 7/20* | (2017.01) |

(Continued)

(52) U.S. Cl.
CPC ............. *G10L 15/22* (2013.01); *B60W 40/08* (2013.01); *G06F 18/251* (2023.01); *G06N 3/08* (2013.01); *G06T 7/20* (2013.01); *G10L 15/16* (2013.01); *G10L 15/25* (2013.01); *B60W 2040/089* (2013.01); *B60W 2420/403* (2013.01); *B60W 2420/54* (2013.01); *B60W 2540/21* (2020.02); *B60W 2540/221* (2020.02); *G06T 2207/30201* (2013.01); *G10L 2015/223* (2013.01)

(58) Field of Classification Search
CPC ......... G10L 15/22; G10L 15/16; G10L 15/25; G10L 2015/223; B60W 40/08; B60W 2040/089; B60W 2420/403; B60W 2420/54; B60W 2540/21; B60W 2540/221; G06F 18/251; G06N 3/08; G06N 3/0442; G06N 3/09; G06N 7/01; G06N 3/045; G06T 7/20; G06T 2207/30201; G06V 10/82; G06V 40/1318
USPC ......................................................... 704/232
See application file for complete search history.

(56) References Cited

U.S. PATENT DOCUMENTS

| | | | |
|---|---|---|---|
| 9,390,726 B1* | 7/2016 | Smus ....................... G06F 3/017 |
| 11,664,043 B2* | 5/2023 | Lyu ......................... G06F 40/30 |
| | | | 704/200 |

(Continued)

OTHER PUBLICATIONS

Baltrusaitis, et al., Multimodal Machine Learning: A Survey and Taxonomy, arXiv:1705.09406v2 [cs.LG] Aug. 1, 2017.

(Continued)

*Primary Examiner* — Pierre Louis Desir
*Assistant Examiner* — Fouzia Hye Solaiman
(74) *Attorney, Agent, or Firm* — Vivacqua Crane, PLLC (57) ABSTRACT

A speech recognition method includes receiving audible data and user data. The audible data includes information about an utterance by the user. The user data includes information about movements by the user. The method further includes fusing the audible data and the user data to obtain fused data and determining at least one spoken word of the utterance based on the fused data.

20 Claims, 3 Drawing Sheets

(51) Int. Cl.
    *G10L 15/16*         (2006.01)
    *G10L 15/25*         (2013.01)

(56)                 References Cited

U.S. PATENT DOCUMENTS

| | | | |
|---|---|---|---|
| 2003/0018475 | A1* | 1/2003 | Basu .............. G06V 40/161 |
| | | | 704/E11.003 |
| 2017/0314930 | A1* | 11/2017 | Monterroza ........... G06N 3/049 |
| 2020/0005806 | A1* | 1/2020 | Seo ....................... H04M 9/082 |
| 2020/0043468 | A1* | 2/2020 | Willett .................... G06N 5/01 |
| 2020/0241824 | A1* | 7/2020 | Lee .......................... G06F 3/017 |
| 2020/0388285 | A1* | 12/2020 | Spiewla ................... G06F 3/167 |
| 2021/0334640 | A1* | 10/2021 | Yi ............................ G06F 3/011 |
| 2023/0038039 | A1* | 2/2023 | Zhao ........................ G01S 5/16 |
| 2023/0219594 | A1* | 7/2023 | Bond ....................... G08G 1/20 |
| | | | 701/23 |

OTHER PUBLICATIONS Li. "Google's 'Project Relate' app lets people with speech impairments create custom transcription models," Nov. 9, 2021. Retrieved from Internet: <URL: https://9to5google.com/2021/11/09/google-project-relate-app/#:~:text=Project%20Relate%20is%20a%20Google%20research%20effort%20to,looking%20for%20public%20English-speaking%20testers%20from%20four%20countries>.

* cited by examiner

SYSTEM AND METHOD FOR INTEGRATING AUDITORY AND NON-AUDITORY INPUTS FOR ADAPTABLE SPEECH RECOGNITION

INTRODUCTION

The present disclosure relates to a system and method for integrating auditory and non-auditory inputs for adaptable speech recognition.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include speech recognition systems. In these vehicles, the user may utter words or phrases, and in response, the speech recognition system recognizes the spoken word or phrases. Once the spoken words are recognized, the vehicle or another device may perform a specific task.

SUMMARY

While speech recognition systems are quite helpful in vehicles and other devices, it may be challenging to recognize speech when a user has a speech impediment, an accent, or another speech-related special need. It is therefore useful to develop a speech recognition system and method that takes into account the user's specific speech-related special need, thereby improving speech recognition quality for each specific user.

The present disclosure describes a speech recognition system and method that uses an auditory input (i.e., audible data) and a non-auditory input (i.e., the user data) for speech recognition. By fusing the auditory input (i.e., audible data) and the non-auditory input (i.e., the user data), the speech recognition system improves the quality of the speech recognition. In doing so, the speech recognition system may identify auditory and non-auditory speech patterns for a specific user. For example, the presently disclosed system may use an utterance by a user (i.e., auditory input) and an image of the facial cues of that particular user (i.e., the non-auditory input) to determine the words spoken by the user, thereby improving the speech recognition quality of the system even if the user has a speech-related special need.

In an aspect of the present disclosure, the speech recognition method includes receiving audible data and user data. The audible data includes information about an utterance by the user. The user data includes information about movements by the user. The method further includes fusing the audible data and the user data to obtain fused data and determining at least one spoken word of the utterance based on the fused data. The data fusion may be conducted using different techniques, such as data Bayesian network, Dempster-Shafer theory, Bayesian filter, and/or a neural network.

In an aspect of the present disclosure, the speech recognition method further includes storing a user profile in a cloud-based system after fine-tuning. The user profile includes specific parameters of a personalized speech recognition system targeted for the user. The speech recognition may further include transmitting the user profile to the vehicle once the user enters the vehicle and processing the audible data and the user data with the personalized speech recognition system.

In an aspect of the present disclosure, the step of determining at least one spoken word of the utterance includes using a trained neural network to determine the spoken word or words of the utterance.

In an aspect of the present disclosure, the method further includes fine-tuning the trained neural network based on the fused data to adapt to speech patterns of the user.

In an aspect of the present disclosure, the audible data is received through a microphone of a vehicle.

In an aspect of the present disclosure, the audible data is received through a microphone of a mobile device.

In an aspect of the present disclosure, the user data is received through a camera of a vehicle.

In an aspect of the present disclosure, the user data is received through a camera of a mobile device.

In an aspect of the present disclosure, the user data includes at least one image of facial cues of the user.

In an aspect of the present disclosure, the user data includes at least one image of a lip of the user.

In an aspect of the present disclosure, the user data and the audible data are received through a camera and a microphone, respectively, of a mobile device. The method further includes transmitting the user data and the audible data from the mobile device to a vehicle.

In an aspect of the present disclosure, the audible data and the user data are received through a microphone and a camera, respectively, of a vehicle. The method further includes transmitting the audible data and the user data from the vehicle to a mobile device.

In an aspect of the present disclosure, the method further includes transmitting the user data and the audible data from the mobile device to a vehicle. Further, the method further includes transmitting a user profile to a fleet of vehicles through a cloud-based system. The user profile includes specific parameters of the speech recognition system targeted for a specific user. Accordingly, a vehicle of the fleet can personalize the speech recognition system.

The present disclosure also describes a speech recognition system. In an aspect of the present disclosure, the speech recognition system includes a first sensor configured to detect an utterance by a user, a second sensor configured to detect movements by the user, and a controller in communication with the first sensor and the second sensor. The controller is configured to receive audible data from the first sensor. The audible data includes information about an utterance from the user. The controller is configured to receive user data from the second sensor. The user data includes information about the movements by the user. The controller is configured to fuse the audible data and the user data to obtain fused data and determine at least one spoken word of the utterance based on the fused data.

In an aspect of the present disclosure, the controller is configured to determine at least one spoken word of the utterance by using a trained neural network.

In an aspect of the present disclosure, the controller is configured to fine-tune the trained neural network based on the fused data to adapt to speech patterns of the user.

In an aspect of the present disclosure, the first sensor is a microphone, and the second sensor is a camera. The microphone and the camera are both located in a vehicle.

In an aspect of the present disclosure, the user data includes at least one image of facial cues of the user.

In an aspect of the present disclosure, the user data includes at least one image of a lip of the user.

In an aspect of the present disclosure, the controller is configured to transmit the user data and the audible data from the mobile device to a vehicle. Further, the controller is configured to transmit a user profile to a fleet of vehicles through a cloud-based system. The user profile includes specific parameters of the speech recognition system targeted for a specific user. Accordingly, a vehicle of the fleet can personalize the speech recognition system.

In an aspect of the present disclosure, the first sensor is a microphone, and the second sensor is a camera. The microphone and the camera are both in a mobile device. The controller is configured to command the mobile device to transmit the user data and the audible data to a vehicle.

In an aspect of the present disclosure, the controller is further configured to store a user profile in a cloud-based system after fine-tuning. The user profile includes specific parameters of a personalized speech recognition system targeted for the user. The controller is further configured to transmit the user profile to the vehicle once the user enters the vehicle and process the audible data and the user data with the personalized speech recognition system.

In an aspect of the present disclosure, the controller is configured to fuse the audible data and the user data using at least one of a Bayesian network, a Dempster-Shafer theory, a Bayesian filter, or a neural network.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
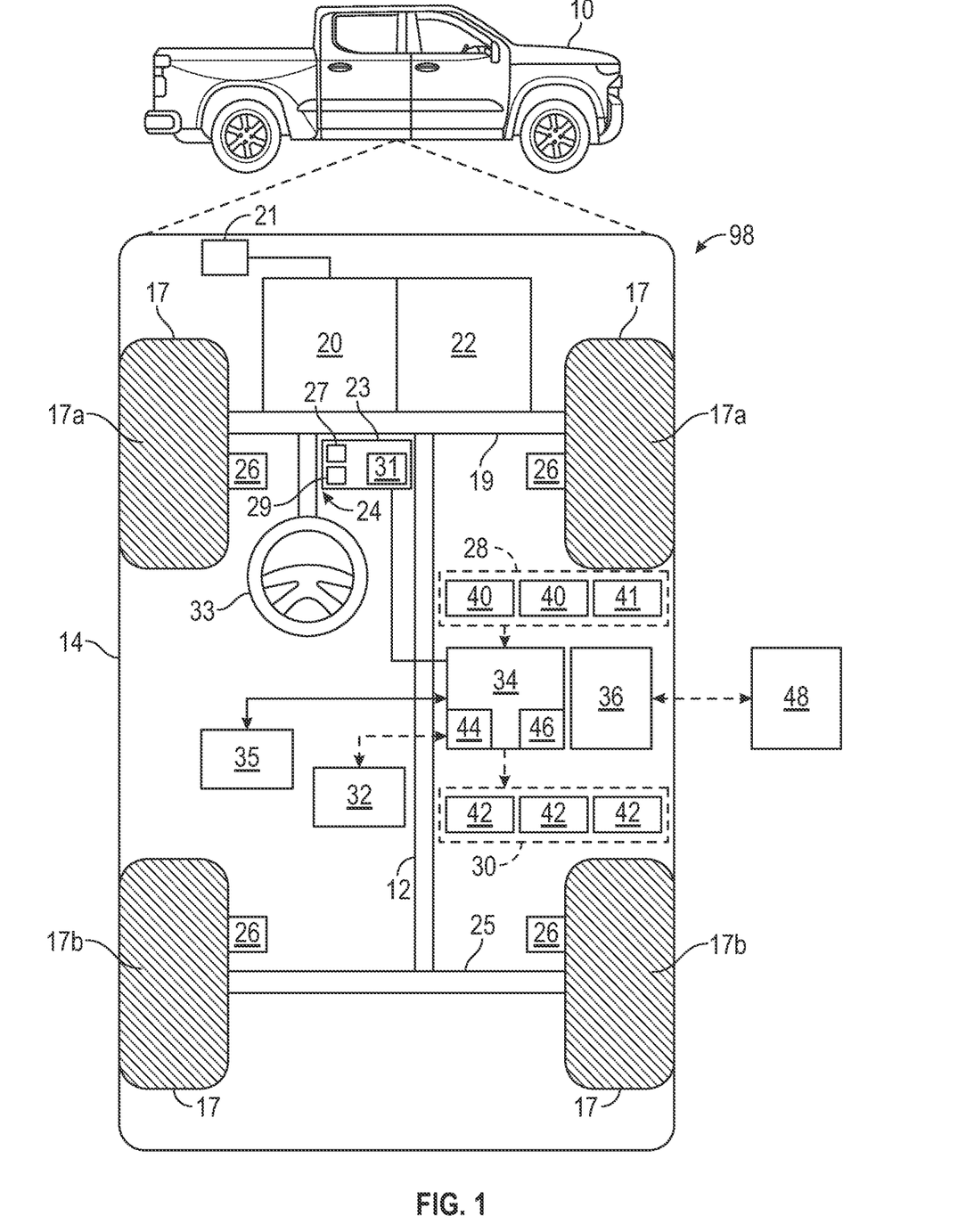
FIG. 1 is a block diagram depicting an embodiment of a vehicle including a speech recognition system.

With reference to FIG. 1, a vehicle 10 generally includes a chassis 12, a body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

In various embodiments, the vehicle 10 may be an autonomous vehicle and a control system 98 is incorporated into the vehicle 10. The control system 98 may be referred to as the system or the speech recognition system. The vehicle 10 is, for example, a vehicle that is automatically controlled to carry passengers from one location to another. The vehicle 10 is depicted in the illustrated embodiment as a pickup truck, but it should be appreciated that other vehicles including motorcycles, trucks, sedans, coupes, sport utility vehicles (SUVs), recreational vehicles (RVs), etc., may also be used. In an embodiment, the vehicle 10 is a so-called Level Four or Level Five automation system. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of the dynamic driving task under a number of roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more odometers, one or more ground penetrating radar (GPR) sensors, one or more steering angle sensors, one or more global positioning systems (GPS) transceivers, one or more tire pressure sensors, one or more cameras 41 (e.g., optical cameras and/or infrared cameras), one or more gyroscopes, one or more accelerometers, one or more speed sensors, one or more steering angle sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the vehicle 10. Because the sensor system 28 provides data to the controller 34, the sensor system 28 and its sensors 40 are considered sources of information (or simply sources).

The sensor system 28 includes one or more Global Navigation Satellite System (GNSS) transceivers (e.g., Global Positioning System (GPS) transceivers) configured to detect and monitor the route data (i.e., route information). The GNSS transceivers is configured to communicate with a GNSS to locate the position of the vehicle 10 in the globe. The GNSS transceiver is in electronic communication with the controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may programmed to execute a speech recognition method 300 (FIG. 4) described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The microphone 31 may be deemed a sensor 40 and is configured to detect an utterance by a user. Specifically, the microphone 31 is configured to convert an audible sound, such as an utterance by a user, to an electrical signal. This electrical signal is representative of the user's utterance. In certain embodiments, the microphone 31 may be referred to as a first sensor, and the camera 41 may be referred to as a second sensor. This second sensor (e.g., camera) is configured to detect movements by the user. The user interface 23 is in electronic communication with the controller 34 and is configured to receive inputs by a user (e.g., vehicle operator). For example, the user interface 23 may include a touch screen and/or buttons configured to receive inputs from a vehicle user. Accordingly, the controller 34 is configured to receive inputs from the user via the user interface 23. The user interface 23 includes one or more displays 29, such as a heads-up display (HUD), an information cluster display, and/or an infotainment center display, configured to display information to the user (e.g., vehicle operator or passenger).

The communication system 36 is in communication with the controller 34 and is configured to wirelessly communicate information to and from other entities 48, such as but not limited to, other vehicles ("V2V" communication), infrastructure ("V2I" communication), remote systems at a remote call center (e.g., ON-STAR by GENERAL MOTORS) and/or personal devices. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs). The communication system 36 is configured to wirelessly communicate information between the vehicle 10 and another vehicle. Further, the communication system 36 is configured to wirelessly communicate information between the vehicle 10 and infrastructure or other vehicles.

Figure 2:
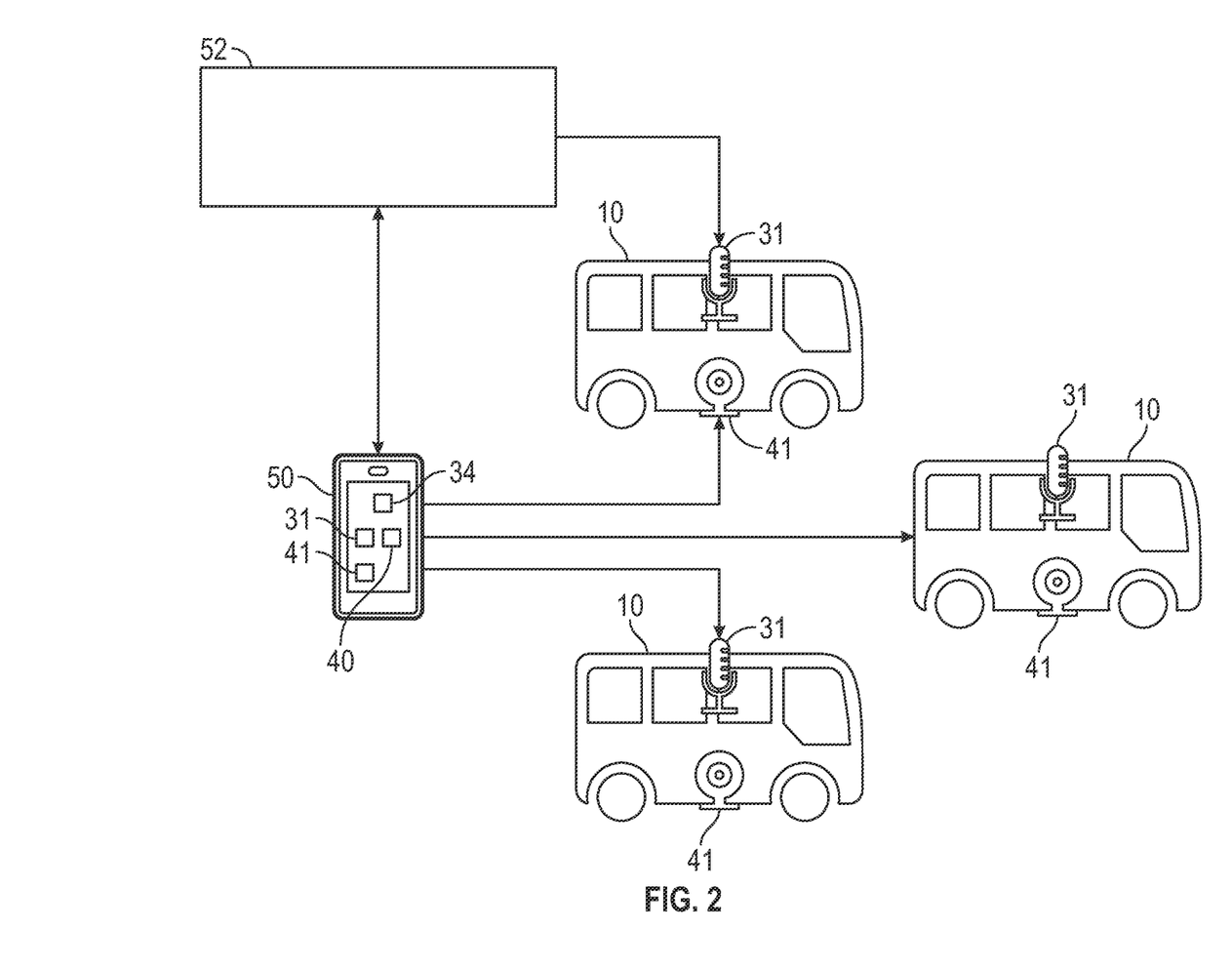
FIG. 2 is a block diagram depicting an embodiment of the vehicle of FIG. 1 in communication with a mobile device and other vehicles.

With reference to FIG. 2, while the controller 34 as shown above is in the vehicle 10, the speech recognition method 300 (FIG. 4) may be executed by the controller 34 in a mobile device 50. Then, the inputs and/or outputs of the speech recognition method 300 are transmitted to one or more vehicles 10. As non-limiting examples, the mobile device 50 may be a mobile phone, a tablet, or a laptop. In certain embodiments, the mobile device 50 includes a controller 34 and sensors 40 in communication with the controller 34. The controller 34 of the mobile device 50 may be referred to as a device controller. The sensors 40 of the mobile device 50 may be referred to as device sensors and include, for example, one or more microphones 31, one or more cameras 41 (e.g., optical cameras and/or infrared cameras), and one or more lidar sensors. The mobile device 50 may be in communication with a fleet of vehicles 10. Each vehicle 10 of the fleet includes the components described above and may be in communication with the mobile device 50 using the communication system 36. As such, a user may use the speech recognition method 300 to provide verbal instructions or messages to all or some of the vehicles 100 of a fleet using one or more mobile devices 50.

With continued reference to FIG. 2, in some embodiments, the speech recognition method 300 (FIG. 4) may be executed by a cloud-based system 52 while the inputs are collected by the mobile device 50 and/or the vehicles 10, which are in communication with cloud-based system 52. In this case, the vehicles 10 and/or the mobile devices 50 may collect the auditory and non-auditory inputs and transmit these inputs to the cloud-based system 52. In the speech recognition method 300, the speech recognition system 98 may transmit a user profile to a fleet of vehicles 10 through a cloud-based system 52. The user profile includes specific parameters of the speech recognition system targeted for a specific user. Thus, the user profile is stored in the cloud-based system 52. Once a user enters the vehicle 10, the cloud-based system 52 transmits the user profile (i.e., the personalized speech recognition system 98) to that vehicle 10. Subsequently, the vehicle 10 uses the personalized speech recognition system 98 to process the data onboard (i.e., the data collected by the vehicle 10). Accordingly, a vehicle of the fleet can personalize the speech recognition system 98.

Figure 3:
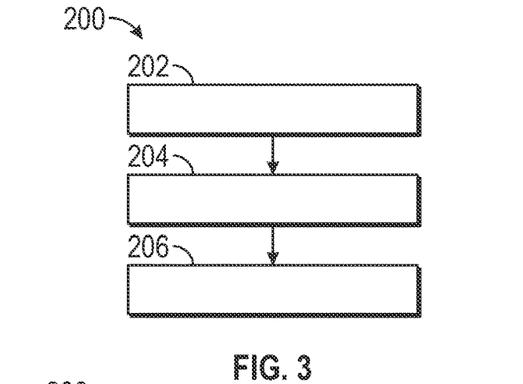
FIG. 3 is a flowchart of a method for creating and training the speech recognition system.
Figure 4:
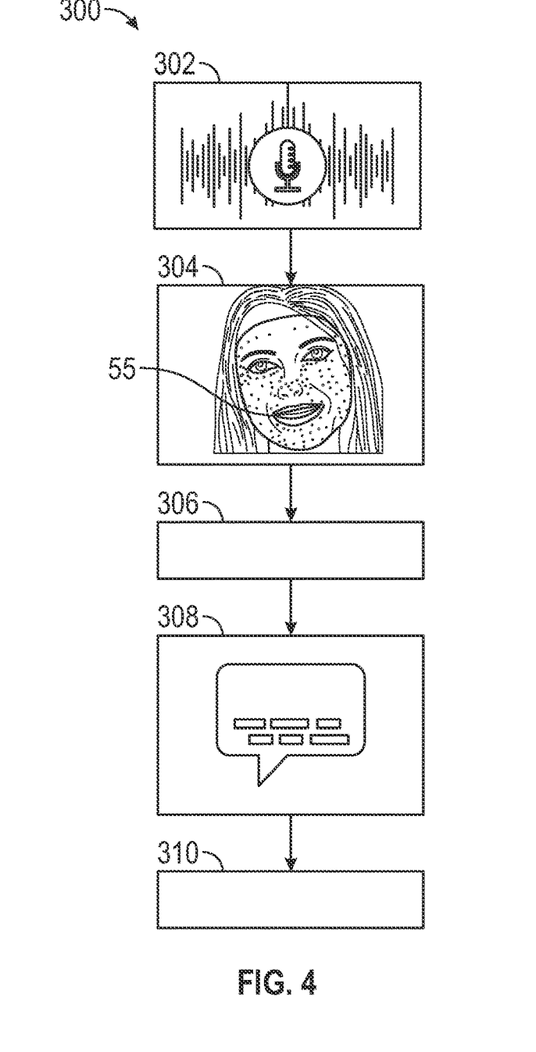
FIG. 4 is a flowchart of the speech recognition method according to an embodiment of the present disclosure.

FIG. 3 is a flowchart of a method 200 for creating and training the speech recognition method 300 (FIG. 4). The method 200 begins at block 202. At block 202, one or more controllers 34 collect communal data using the sensors 40. The controller 34 that creates and trains the speech recognition method 400 is not necessarily part of a vehicle 10 and/or a mobile device 50. As used herein, the term "communal data" refers to a sufficient amount of audible data and user data from users in the community to develop a reliable speech recognition model. In the present disclosure, the term "audible data" means data about an utterance by the user, such as audio data. Therefore, the audible data includes information about an utterance by one or more users. The audible data may be referred as an auditory input because the audible data includes the audible sound from an utterance by a user. The audible data may be collected by one or more microphones 31. The microphone 31 may be a transducer that converts audible sound to an electrical signal that is representative of the audible sound. As discussed above, the communal data also includes user data. In the present disclosure, the term "user data" means data about movements conducted by the user. Accordingly, the user data includes information about movements by the user. As a non-limiting example, the user data may include spatial data of parts of the user's body (e.g., mouth, face, and/or hands) relative to a reference point. As such, the user data may include data about the user's movements, such as gestures (e.g., hand gestures and/or facial gestures), facial cues, head movements, and mouth movements (e.g., lip movement). The user data may, for example, include one or more images of the mouth and/or facial cues of the user. The user data may be collected by one or more cameras 41 (e.g., optical camera and/or infrared cameras) and/or lidar sensors. The optical cameras may be used for optical imaging, and the infrared cameras may be used for imaging in low-light or imaging through sunglasses. In other words, optical cameras may capture images of the user movements, and infrared cameras may capture thermal images of user's face even when the user is wearing sunglasses. Lidar sensors may take depth measurements. The lidar sensors may measure the distance from the user's face or other parts of the user body to a reference point and, therefore, detect movements by the user. Regardless of the specific sensors 40 used to obtain the user data, the sensors 40 are used to detect head/face positioning, facial expressions, hand gestures, mouth shape, and/or gaze/eye tracking. In addition, the sensors 40 for collecting user data may include pressure sensors for collecting pressure data and data from wearable devices, such as a smart wristwatch. The pressure data may be used to detect the user's pose in a seat and/or arm movements. The data from wearable devices may be used to monitor user motion and gestures. Once the communal data has been collected, the method 200 proceeds to block 204.

At block 204, the speech recognition system (e.g., control system 98) is created and trained using the communal data. A neural network may be used to create and train the speech recognition system. As non-limiting examples, the speech recognition system may be created and trained using a recurrent neural network (RNN) or a transformer architecture. RNN are used to analyze sequence-like data. As a non-limiting example, RNNs may include long short-term memory (LSTM) and gated recurrent unit (GRU) architectures. At this point, the speech recognition system is generic and is not individualized to a particular user. After block 204, the method 200 continues to block 206.

At block 206, the speech recognition system (e.g., control system 98) is deployed. To do so, the speech recognition system may be deployed to the cloud-based system 52, a mobile device 50, and/or one or more vehicles 10. This speech recognition system may be configured as a speech assistant.

FIG. 4 is a flowchart of the speech recognition method 300. The speech recognition method 300 begins at block 302. At block 302, the controller 34 receives audible data from one or more sensors 40. As discussed above, the audible data includes information about an utterance by the user. The audible data may be referred to as an auditory input because the audible data includes the audible sound from an utterance by a user. Moreover, the audible data is collected by one or more sensors 40 (e.g., microphone 31), which may be located in the vehicle 10 and/or the mobile device 50. In certain embodiments, if the sensors 40 (e.g., microphone 31)

are located in the mobile device 50, the audible data may be transmitted to the vehicle 10 and/or the cloud-based system 52. The audible data may be shared with other vehicles 10 through the cloud-based system 52. If the sensors 40 are located in the vehicle 10, the audible data collected by the sensors 40 may be transmitted to the mobile device 50 and/or the cloud-based system 52. Accordingly, the controller 34 receives the audible data. The method 300 also includes block 304.

At block 304, the controller 34 (which may be in the vehicle 10 and/or the mobile phone 50) receives user data from one or more sensors 40. As discussed above, the user data includes information about movements by the user, such as facial cues, mouth movements, and gestures (e.g., hand gestures and/or facial gestures). The user data may be referred as a non-auditory input because the user data does not include audible sound. The user data is collected by one or more sensors 40 (e.g., one or more cameras 41 and/or lidar sensors). It is desirable to collect the user data because such collection may facilitate speech recognition. For example, the user may utter the word "yes" while nodding her head. In this case, the sensors 40 detect that the user is nodding her head and associate such user motion with the word "yes". For this reason, the sensors 40 may detect (e.g., capture images) of head movements (e.g., nodding) of the user. If the sensors 40 (e.g., one or more cameras 41 and/or lidar sensors) are located in the mobile device 50, the user data may be transmitted to the vehicle 10 and/or the cloud-based system 52. The user data may be shared with other vehicles 10 through the cloud-based system 52. If the sensors 40 are located in the vehicle 10, the user data collected by the sensors 40 may be transmitted to the mobile device 50 and/or the cloud-based system 52. Accordingly, the controller 34 receives the user data. Block 302 and block 304 may be executed simultaneously because some users coordinate movements, such as hand gestures or lip movements, with their utterances. Accordingly, by executing block 302 and block 304 simultaneously, the speech recognition method 300 may enhance its accuracy. After executing blocks 302 and 304, the method 300 proceeds to block 306.

At block 306, the controller 34 fuses the audible data and the user data to obtain fused data. The data fusion may be conducted using different techniques, such as data Bayesian network, Dempster-Shafer theory, Bayesian filter, and/or a neural network. Regardless of the technique used, the controller 34 integrates (i.e., fuses) the audible data (i.e., the auditory input) and the user data (i.e., the non-auditory input) for improving speech recognition. In the present disclosure, the term "fusion" or "integration" means linking individual utterances or specific audible data with individual movements or specific camera data. It is desirable to fuse the user data and the audible data because, in many cases, users coordinate utterances with body movements. For example, the user may utter the word "no" while moving her head from side to side. In this case, the sensors 40 detect that the user is moving her head side to side, and the controller 34 associates such head motion with the word "no" by fusing the user data and the audible data. After fusing the audible data and the user data, the method 300 proceeds to block 308.

At block 308, the controller 34 determines at least the one spoken word based on the user utterance based on the integrated user data and the audible data (i.e., the fused data). Also, at block 308, the controller 34 may command the vehicle 10 to perform a specific task. For instance, the user utterance may include a command, such as "turn on seat heaters". In response to receiving this utterance, the controller 34 commands the vehicle 10 to turn one or more actuator devices 42 to turn on the seat heaters. In another example, the user utterance may include a command, such as "Go Home". At this point the controller 34 commands the GNSS transceiver to retrieve the "Home" location and the navigation system provides instructions to reach "Home". After block 308, the controller 34 continues to block 310.

At block 310, the controller 34 fine-tunes the speech recognition system based on the fused data to adapt to speech patterns of a particular user. In the present disclosure, "fine-tuning" or "fine-tunes" means training the neural network based on using recognized spoken words linked to movements and categorizing those movements as meaning the spoken word. As a non-limiting example, the controller 34 fine-tunes the trained neural network to adapt to speech patterns of a particular user. The fused data is therefore stored relative to particular users. For instance, a user with a speech impediment may move her lips 55 in a particular way when uttering the word "navigation." While fine-tuning the trained neural network, the controller 34 identifies this particular lip movement (i.e., speech pattern) when this specific user utters the word "navigation" and, therefore, associates this particular lip movement with the word "navigation" for that particular user. As a result, the speech recognition method 300 allows the speech recognition system to be adaptable to specific users. After fine-tuning, the speech recognition system 98 may transmit a user profile to one vehicle 10 or a fleet of vehicles 10 through a cloud-based system 52. The user profile includes specific parameters of the speech recognition system targeted for a specific user. Thus, the user profile is stored in the cloud-based system 52. Once a user enters the vehicle 10, the cloud-based system 52 transmits the user profile (i.e., the personalized speech recognition system 98) to that vehicle 10. Subsequently, the vehicle 10 uses the personalized speech recognition system 98 to process the data onboard (i.e., the audible data and the user data collected by the vehicle 10). Accordingly, a vehicle of the fleet can personalize the speech recognition system 98.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A speech recognition method, comprising:
    receiving audible data, wherein the audible data includes information about an utterance by a user;
    receiving user data, wherein the user data includes information about movements by the user, wherein the user data includes hand gestures of the user, and the user data includes an image of a lip of the user;
    fusing the audible data and the user data to obtain fused data; and
    determining at least one spoken word of the utterance based on the fused data;
    wherein determining the at least one spoken word of the utterance includes:
        using a trained neural network to determine the at least one spoken word of the utterance;
        fine-tuning the trained neural network based on the fused data to adapt to speech patterns of the user, wherein fine-tuning the trained neural network includes:
            identifying a particular lip movement when the user utters a particular word, wherein the particular word is "navigation"; and
            associating the particular lip movement with the particular word uttered by the user.

2. The method of claim 1, wherein the audible data is received through a microphone of a vehicle.

3. The method of claim 1, wherein the audible data is received through a microphone of a mobile device.

4. The method of claim 1, wherein the user data is received through a camera of a vehicle.

5. The method of claim 1, wherein the user data is received through a camera of a mobile device.

6. The method of claim 1, wherein the user data includes at least one image of facial cues of the user.

7. The method of claim 1, further comprising:
    storing a user profile in a cloud-based system after fine-tuning, wherein the user profile includes specific parameters of a personalized speech recognition system targeted for the user;
    transmitting the user profile to a vehicle once the user enters the vehicle; and
    processing the audible data and the user data with the personalized speech recognition system.

8. The method of claim 1, wherein the user data and the audible data are received through a camera and a microphone, respectively, of a mobile device, and the method further comprises transmitting the user data and the audible data from the mobile device to a vehicle.

9. The method of claim 1, wherein the audible data and the user data are received through a microphone and a camera, respectively, of a vehicle, and the method further comprises transmitting the audible data and the user data from the vehicle to a mobile device.

10. The method of claim 1, wherein fusing the audible data and the user data includes using at least a Bayesian filter.

11. A speech recognition system, comprising:
    a first sensor configured to detect an utterance by a user;
    a second sensor configured to detect movements by the user;
    a controller in communication with the first sensor and the second sensor, wherein the controller is configured to:
        receive audible data from the first sensor, wherein the audible data includes information about the utterance by the user;
        receive user data from the second sensor, wherein the user data includes information about the movements by the user;
        fuse the audible data and the user data to obtain fused data; and
        determine at least one spoken word of the utterance based on the fused data;
    wherein the controller is configured to determine the at least one spoken word of the utterance by:

using a trained neural network to determine the at least one spoken word of the utterance;

fine-tuning the trained neural network based on the fused data to adapt to speech patterns of the user; and wherein the controller is configured to fine-tune the trained neural network by identifying a particular lip movement when the user utters a particular word, wherein the particular word is "navigation"; and associating the particular lip movement with the particular word uttered by the user.

12. The system of claim 11, wherein the controller is configured to determine the at least one spoken word of the utterance by using a trained neural network.

13. The system of claim 12, wherein the controller is configured to fine-tune the trained neural network based on the fused data to adapt to speech patterns of the user.

14. The system of claim 11, wherein the first sensor is a microphone, and the second sensor is a camera, and the microphone and the camera are both located in a vehicle.

15. The system of claim 11, wherein the user data includes at least one image of facial cues of the user or at least one image of a lip of the user.

16. The system of claim 11, wherein the controller is configured to transmit the user data and the audible data to a fleet of vehicles through a cloud-based system.

17. The system of claim 13, wherein the controller is further configured to:

store a user profile in a cloud-based system after fine-tuning, wherein the user profile includes specific parameters of a personalized speech recognition system targeted for the user;

transmit the user profile to a vehicle once the user enters the vehicle; and process the audible data and the user data with the personalized speech recognition system.

18. The system of claim 11, wherein the controller is configured to fuse the audible data and the user data using at least one of a Bayesian network, a Dempster-Shafer theory, a Bayesian filter, or a neural network.

19. A speech recognition system, comprising:

a first sensor configured to detect an utterance by a user;

a second sensor configured to detect movements by the user; and a controller in communication with the first sensor and the second sensor, wherein the controller is configured to:

receive audible data, wherein the audible data includes information about an utterance by a user;

receive user data, wherein the user data includes information about movements by the user, and the user data includes an image of lip of the user;

fuse the audible data and the user data to obtain fused data; and determine at least one spoken word of the utterance based on the fused data;

wherein the controller is configured to determine the at least one spoken word of the utterance by:

using a trained neural network to determine the at least one spoken word of the utterance;

fine-tuning the trained neural network based on the fused data to adapt to speech patterns of the user; and wherein the controller is configured to fine-tune the trained neural network by:

identifying a particular lip movement when the user utters a particular word, wherein the particular word is "navigation"; and associating the particular lip movement with the particular word uttered by the user.

20. The system of claim 19, wherein the user data includes hand gestures, the user data includes facial gestures.

* * * * *